United States Patent [19]
Takai et al.

[11] Patent Number: 5,548,399
[45] Date of Patent: Aug. 20, 1996

[54] METHOD AND APPARATUS FOR TESTING A DC COUPLED OPTICAL RECEIVER

[75] Inventors: Atsushi Takai, Kokubunji; Shoichi Hanatani, Yono, both of Japan

[73] Assignee: Hitachi, Ltd., Tokyo, Japan

[21] Appl. No.: 131,826

[22] Filed: Oct. 5, 1993

[30] Foreign Application Priority Data

Oct. 8, 1992 [JP] Japan .................................. 4-269977

[51] Int. Cl.⁶ ...................................................... G01J 1/42
[52] U.S. Cl. .......................... 356/218; 359/110; 371/5.1
[58] Field of Search .................... 356/213, 214, 356/215, 216, 217, 218, 219, 221, 222, 225, 226, 229, 73.1; 359/109, 110, 111, 117, 189; 371/5.1

[56] References Cited

U.S. PATENT DOCUMENTS 5,153,667 10/1992 Aoshima et al. .................. 356/218

FOREIGN PATENT DOCUMENTS 0159855 6/1990 Japan ................................. 371/5.1

OTHER PUBLICATIONS

"Subsystem Optical Interconnections Using Long-Wavelength Laser Diode and Single-mode Fiber Arrays", by Atsushi Takai, et al., Aug. 5, 1992.

Institute Electronic, Information and Communication Engineers of Japan, Technical Research, Report, OCS92-30.

S. Hanatani et al., "Fully-Integrated Error-Free Optical Subsystem Interconnections", Denshi Tokyo No. 32, (1993) pp. 194–198.

S. Hanatani et al., "Transmission Characteristics of Optical Subsystem Interconnections", Technical Report of IEICE, (1993) pp. 25–32.

A. Takai et al., "200–Mb/s/ch 100–m Optical Subsystem Interconnections Using 8–channel 1.3–m Laser Diode Arrays and Single–Mode Fiber Arrays", Journal of Lightwave Technology, vol. 12, No. 2, Feb. 1994, pp. 260–269.

*Primary Examiner*—Hoa Q. Pham
*Attorney, Agent, or Firm*—Kenyon & Kenyon

[57] ABSTRACT

A method of testing a DC coupled optical receiver is provided. DC light is superimposed on an optical signal, the power of DC light is changed to observe waveform at a light extinction level, and the measurement and the prediction of the bit error rate are performed. Similarly, in a multi-channel DC coupled optical receiver, DC light is applied to a channel to be observed, while signal light is applied to other channels to observe cross-talk.

9 Claims, 9 Drawing Sheets

AXIS OF ABSCISSAS : 2ns/Div

NO SIGNALS IN ANY CHANNEL

MEASURED CHANNEL IMPRESSED WITH A SIGNAL

OTHER CHANNELS IMPRESSED WITH NO SIGNALS

MEASURED CHANNEL IMPRESSED WITH NO SIGNAL

OTHER CHANNEL IMPRESSED WITH SIGNALS

ALL CHANNELS IMPRESSED WITH SIGNALS

MEASURED CHANNEL IMPRESSED WITH A SIGNAL + NOISE

OTHER CHANNELS IMPRESSED WITH NO SIGNALS

METHOD AND APPARATUS FOR TESTING A DC COUPLED OPTICAL RECEIVER

BACKGROUND OF THE INVENTION

1. Field of the Invention

This invention relates to a method of testing an optical receiver comprising DC (Direct Current) coupled circuits for an optical link or an optical interconnection used in an information processor, and more particularly to a method and apparatus for testing the characteristic of a DC coupled optical receiver when a bit error rate of the receiver is very low.

2. Description of the Related Art

A optical receiver will be described hereinafter.

In a conventional receiver, a small optical signal, received after a long distance transmission through optical fibers, is converted to an electric signal, which is regenerated after being amplified. To stabilize the circuit operation, an analog amplifier of the receiver cuts a DC component of the signal. The optical signal is coded and scrambled such that an average DC level is set to be constant within the amplitude of the signal (usually a mid-level of the amplitude of the signal). As used herein "DC level of light" or "DC light level" means a constant intensity level of light. The decision level (threshold) of 0 or 1 in the receiver is set with respect to the average DC level. To this end, the receiver has a complicated structure which includes an automatic gain control circuit which provides a fixed amplitude using amplitude detection and gain control.

However, optical links provided between information processors, such as computers or switching systems, are required to transfer uncoded data, so-called unformatted data. The devices used for such optical links are required to be reduced in size and have reduced power consumption and the circuits in the devices are required to be simplified. The above-mentioned requisites are indispensable for optical interconnection, such as is disclosed in Atushi Takai et al.: "Sub-system optical Interconnections using Long Wavelength Laser Diode and Single-mode Fiber Arrays", Institute of Electronic, Information and Communication Engineers of Japan, TECHNICAL RESEARCH REPORT OCS92-30, published in 1992.

One type of optical receiver which satisfy such requisites includes DC coupled amplifiers, which do not cut DC component of the signals. In the above-mentioned case, the transmission distance is several hundred meters, so that transmission loss is negligible and an optical signal having a large amplitude can be input to the receiver. Thus, a slight fluctuation in the threshold, which distinguishes between 0 and 1, is allowable. In addition, the number of amplifier stages is reduced. Furthermore, since in the above-mentioned case a deviation in the input optical power is large, due to variations in the transmitter optical output and in the connecter loss, which causes the average DC level fluctuate, the DC coupled optical receivers are employed using an extinction level as a reference for defining a threshold in many cases.

As described in the reference, such an unformatted data receiver adopts a fixed decision level relative to the extinction level which does not depend on the amplitude of the input signal. This simplifies the circuit structure, which thereby reduces the size and power consumption of the optical receiver.

Of course, the DC coupled optical receiver is applicable to the transfer of coded or scrambled data, although the applicable distance is short compared to the conventional receiver.

A method of testing the optical receiver will be described next. Conventionally, when the bit error rate characteristic is tested, the input optical signal to the optical receiver is attenuated by an optical attenuator and the relationship between the amplitude of the signal and bit error rate is measured, because the circuit and the threshold are designed to use a given level within the amplitude (usually, a midpoint of the amplitude) as a reference and waveform degradation in the receiver, which will influence the bit error rate, is substantially directly proportional to the amplitude of the signal.

In contrast, since the DC coupled receiver uses the extinction level as a reference for defining the threshold, a new system which measures the bit error rate characteristic is required to be devised. Waveform degradation in the receiver at the extinction level is required to be directly measured because the bit error rate depends on the waveform at the extinction level.

In a multi-channel receiver, an influence by a cross-talk depends on the phase difference in data between a reference channel and other channels in the optical interconnection. Thus, cross-talk at the extinction level is required to be directly measured.

Further, a low bit error rate, on the order of $10^{-20}$, must be ensured to apply the DC coupled receiver to an information processor and thus a testing method therefor must be established.

SUMMARY OF THE INVENTION

It is an object of the present invention to achieve testing of characteristics related to the extinction level for a DC coupled receiver.

It is another object of the present invention to achieve testing of bit error rate characteristics of a fixed decision level system in the DC coupled receiver.

It is still another object of the present invention to measure the worst value of other characteristics, such as a bit error rate characteristic, by directly observing waveform degradation.

It is a further object of the present invention to provide a testing method which ensures a very low bit error rate of a DC coupled receiver.

In order to achieve the above objects, the present invention includes a testing method comprising the steps of:

(1) superposing DC light on signal light, inputting the resulting light to the DC coupled receiver and testing a characteristic of the receiver;

(2) changing the DC light power and testing the characteristics;

(3) predicting a characteristic on the basis of the result of the measurement; and in the case of testing a multi-channel structure, superposing DC light on the signal light in a measured channel.

FIG. 1 shows the principles of the invention. An electrical output of a DC coupled optical receiver is plotted with respect to a light power inputted to the receiver. Emission and extinction of light correspond to the output values of the receiver. It is not essential whether extinction corresponds to the low (0) level or to the high (1) level. In FIG. 1, extinction corresponds to the low level. In the present specification input light power PIL is defined as a maximum power that gives low level output and PIH is defined as a minimum power that gives high level output. The decision level is between PIH and PIL.

As shown in FIG. 1, superposition of DC light shifts the extinction region to a non-saturation or linear region (between PIL and PIH) of the input-output characteristic of the receiver to thereby allow observation of a waveform at the extinction level.

Superposition of the DC light shifts the extinction level close to the decision level to thereby allow the bit error rate to be measured in a short time. By a change in the DC light power, the bit error rate in a DC light-free state or in a state of use of the receiver is predicted.

The DC light power for a particular bit error rate obtained by this measurement is usable as an index indicative of a bit error rate characteristic of the receiver.

In a multi-channel receiver, superposition of DC light on any one channel allows a measurement of the influence from other channels. Thus, the maximum cross-talk can be measured and the influence of the cross-talk on the bit error characteristic is predicted. These testing methods bring about the assurance and the selection of the characteristic of a DC coupled optical receiver.

DESCRIPTION OF THE PREFERRED EMBODIMENTS

An embodiment of the present invention will be described below with respect to FIGS. 2–11. DC coupled optical receiver to be tested in the present embodiment will be described. Assume that the receiver tested in the present embodiment is a 200-Mbit/s-per-channel 9-channel parallel transmission receiver.

Figure 1:
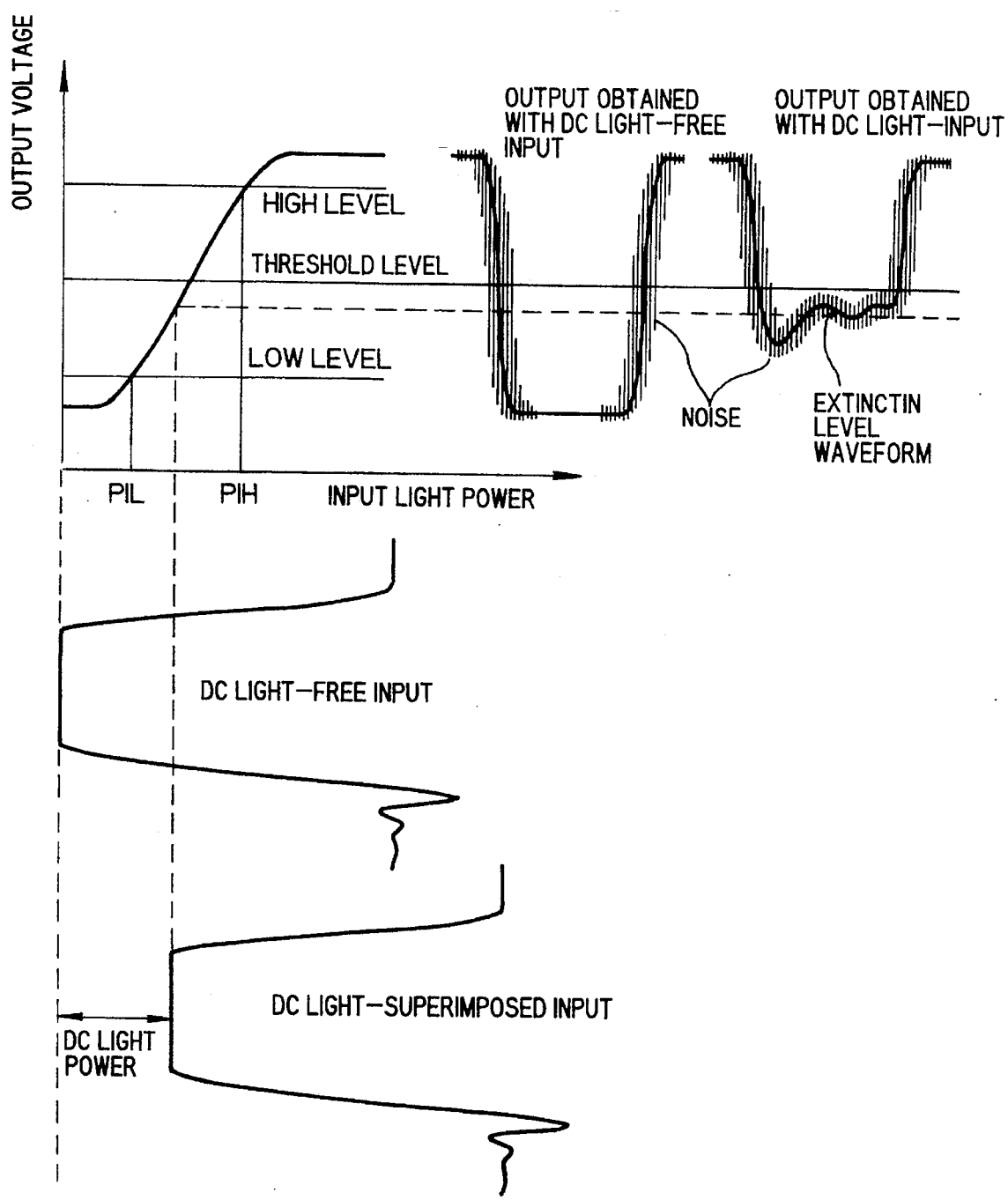
FIG. 1 shows the operative principles of the invention.
Figure 2:
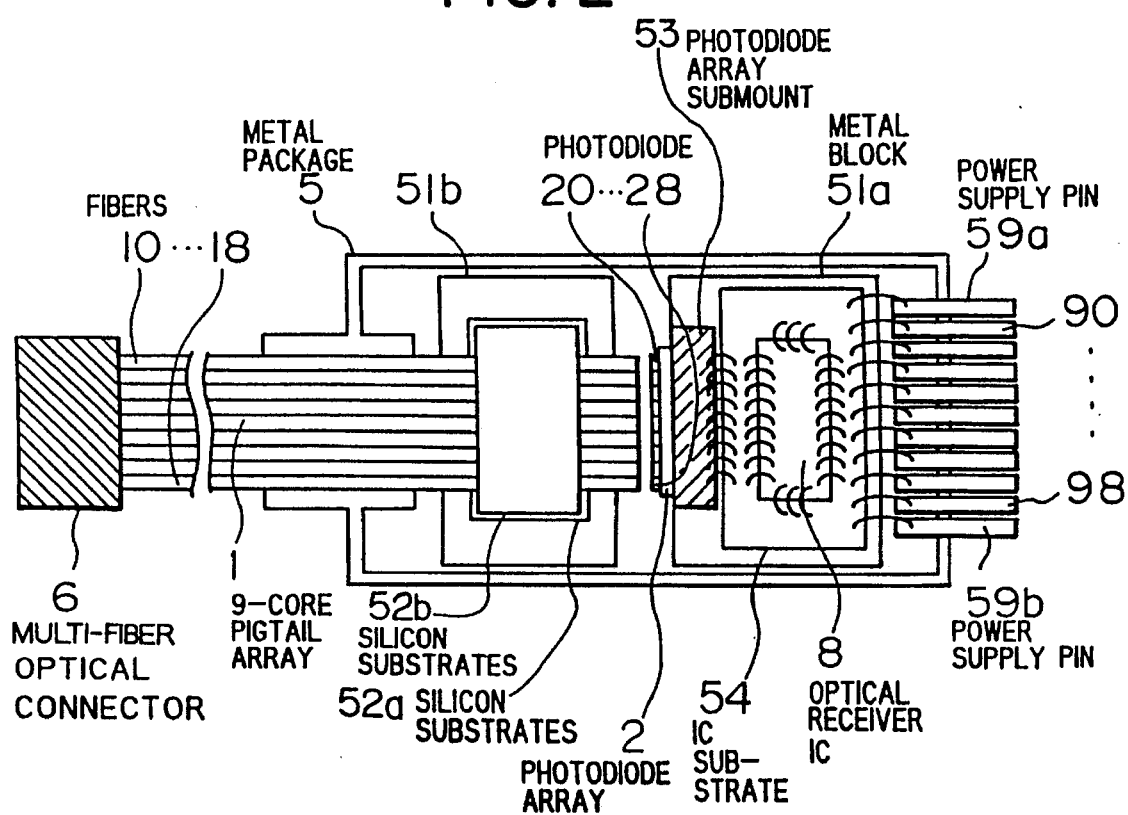
FIG. 2 shows the structure of an optical receiver used in an embodiment of the present invention.

FIG. 2 shows the structure of the optical receiver or module which includes a multicore optical connector 6; a 9-core pig-tail fiber array 1 of fibers 10–18; a photodiode array 2 of photodiodes 20–28 fixed to a submount 53; an IC substrate 54 on which an optical receiver IC 8 is mounted; nine electric signal outputs 90–98; two power supply pins 59a, 59b; a first metal block 51a in which the IC substrate 54 and the photodiode array submount 53 are fixed by soldering; a V grooved silicon substrate 52a in which the fibers 10–18 of the pig-tail fiber array 1 are fixed at a predetermined position; a silicon substrate 52b which has been fixed with the fibers; a second metal block 51b which has been fixed with the silicon substrate 52a by soldering; and a metal package 5 which mounted with the above-mentioned parts. The optical signal from the fiber array 1 is converted to an electrical signal using the photodiodes and the receiver IC, and the converted signal is outputted to pins 90–98.

Figure 3:
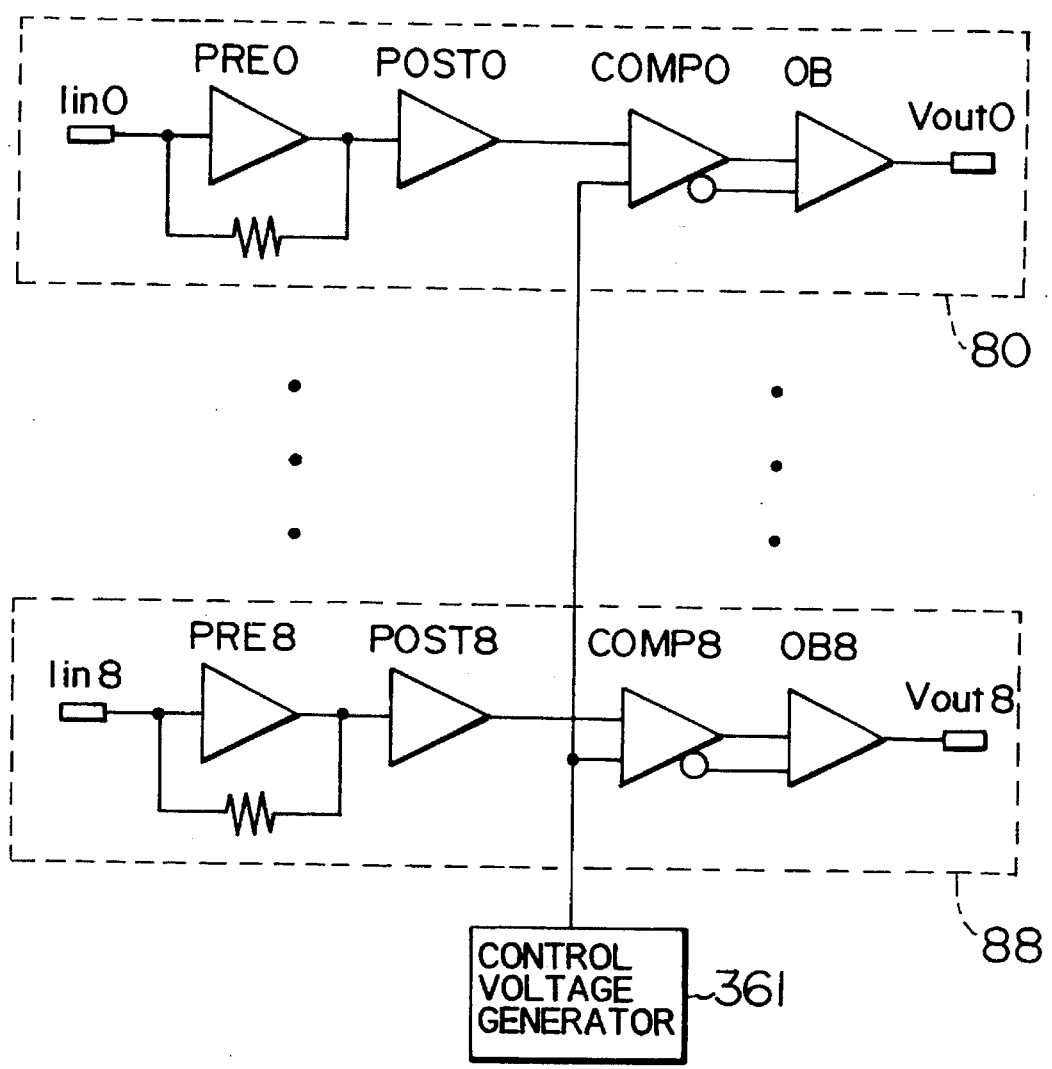
FIG. 3 is an IC circuit diagram of an optical receiver used in the embodiment.

FIG. 3 shows the circuit of the receiver IC in the optical receiver module of FIG. 2. The receiver IC includes nine identical receiver circuits 80–88 and a control voltage generator 361. The receiver circuit 80 includes a light input terminal Iin0, a signal output terminal Vout0, a preamplifier PRE0, a post-amplifier POST0, a comparator COMP0 having a decision function, and an output buffer OB0.

As shown in FIG. 3, the amplifiers have no DC-blocking component therebetween. The receiver circuit 80 is of a DC coupled circuit type. The decision level or threshold level is set at a fixed level from an extinction level.

The numerical characteristic of the optical receiver is as follows: The bit error rate Pe is required to be less than $10^{-20}$, which is a value to allow the bit error rate to be negligible to thereby bring about error-free transfer and provides a probability of an error occurring once per 1600 years at a transmission rate of 200 Mbits/s. An equivalent root mean square noise input power, Pn, is 0.2 µW. In order to obtain the bit error rate to a value less than $10^{-20}$, the optical input power, hereinafter represented by Pn(–20), is required to be 9.3 times larger than Pn. Herein, Pn(–20)=2 µW. The input optical signal power is between 80 and 400 µW. An equivalent fixed threshold to input power (decision level) is set at 25 µW in a standard state, which is much larger than P(–20), which is 2 µW.

Figure 5:
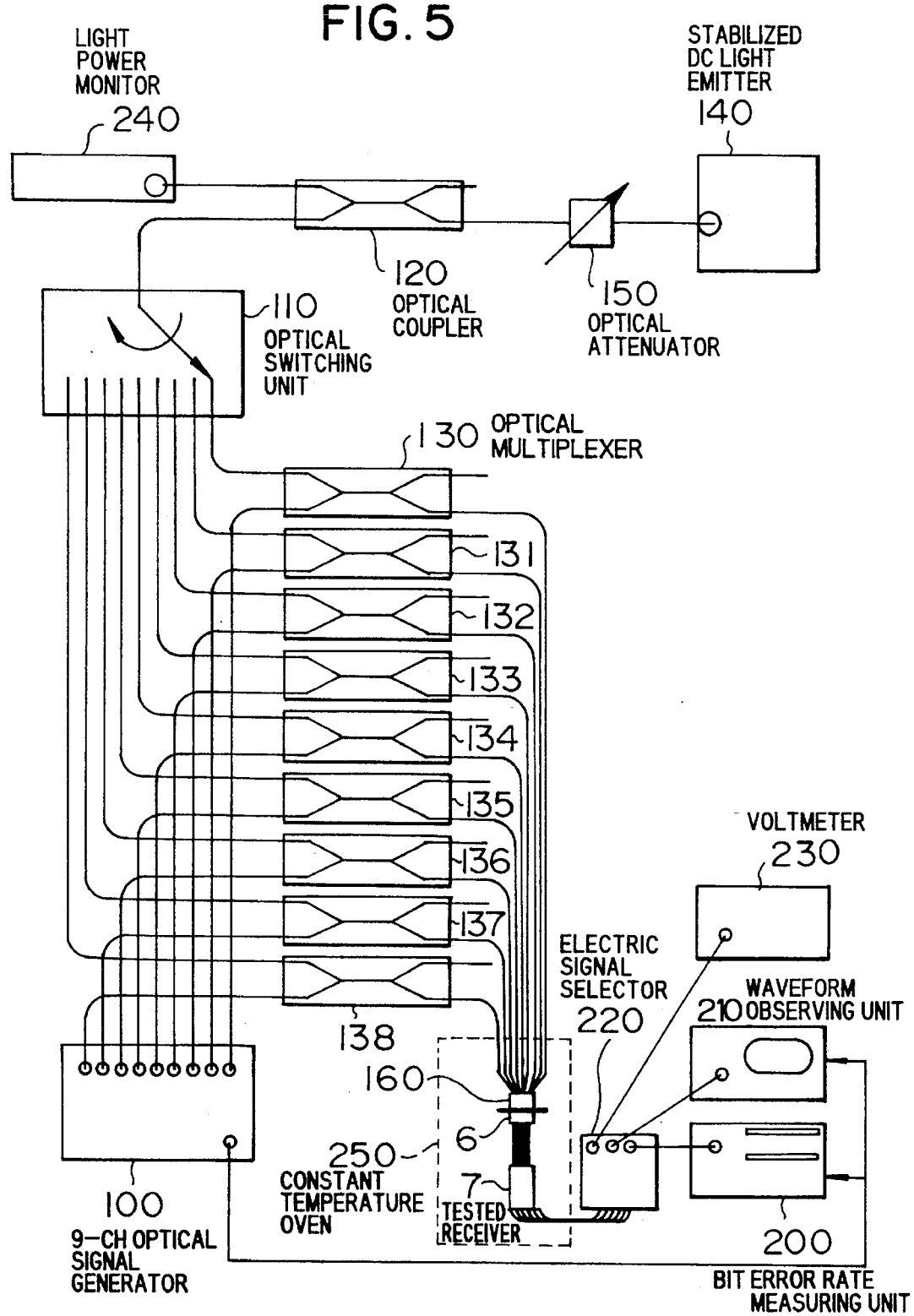
FIG. 5 shows a characteristic measurement apparatus of the embodiment.

An optical receiver testing apparatus of the present embodiment shown in FIG. 5 will be described next. The apparatus includes a 9-channel optical signal generator 100; optical multiplexers 130–138; a stabilized DC light emitter 140; an optical attenuator 150; an optical coupler 120; a light power monitor 240; an optical switching unit 110; a multi-fiber connector 160; a receiver to be tested 7; an electric signal selector 220; a voltmeter 230; a waveform observing unit 210; a bit error rate detector 200; and optical fibers connecting those elements. Reference numeral 250 denotes a constant temperature oven. The optical signals generated by the 9-channel optical signal generator 100 are lead to the corresponding optical multiplexers 130–138, and one of the signals is superposed with DC optical light from the optical switching unit 110. The resulting signals are inputted to the receiver 7 through the multicore connectors 6 and 160. The DC light, adjusted by the stabilized DC light emitter 140 and the optical attenuator 150, is added in one channel selected by the optical switching unit 110. The added DC light is monitored by an optical coupler 120 and a light power monitor 240. One of the nine converted signals is selected by an electric signal selector 220 and the selected signal is delivered to the voltmeter 230, the waveform observing unit 210 and the bit error rate measuring unit 200.

Figure 4:
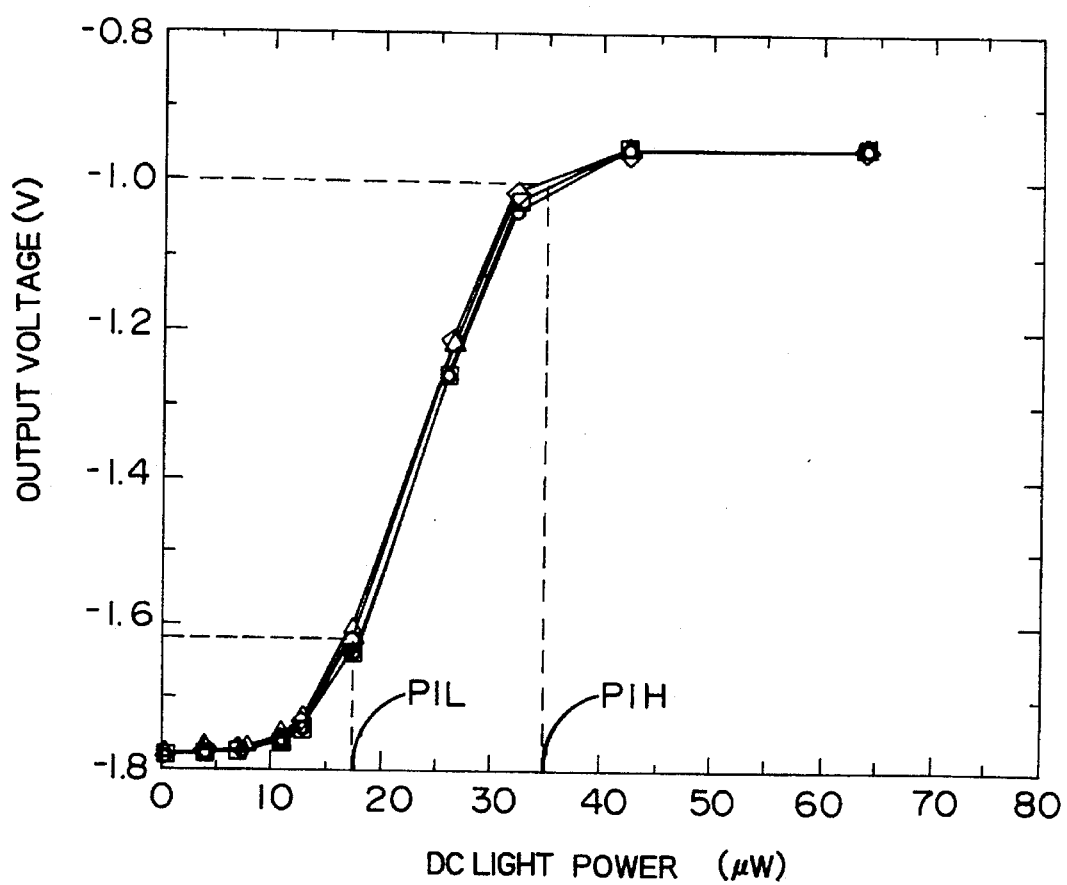
FIG. 4 shows the input-output characteristic of the receiver used in the embodiment.

A method of measuring the characteristic of the optical receiver of FIG. 2, using the testing apparatus of FIG. 5 will be described below. FIG. 4 shows the outputs of the optical receiver when each of the channels of the receiver is inputted with DC light. The measurement is performed by changing the DC light power in an optical signal-free state. At this time, the input light power PIH which provide the output voltage –1.025 V, the minimum high level of an ECL (Emitter Coupled Logic) circuit, is defined as a high level input light power, while the input light power PIL which provides the output voltage −1.62 V, the maximum low level in an ECL current, is defined as a low level input light power. In FIG. 4, PIH is 36 µW and PIL is 17 µW.

Figure 6:
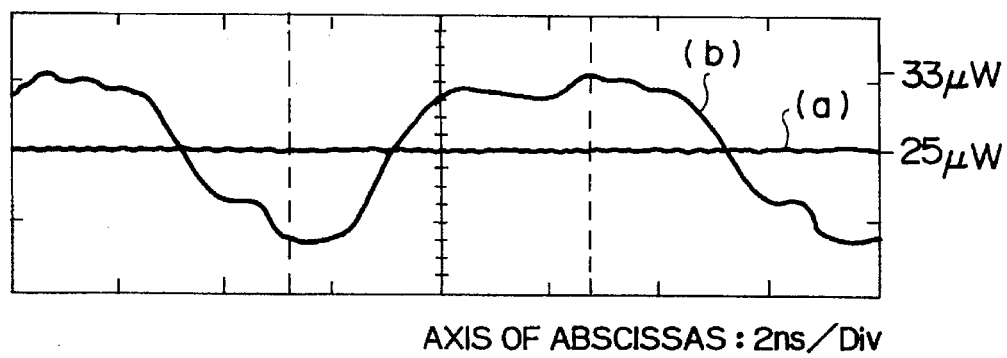
FIG. 6 shows the result of evaluation of a cross-talk characteristic in the embodiment.

FIG. 6 shows the cross-talk characteristic of the present receiver. In this measurement, when a DC light power, which does not saturate the output voltage of the receiver, was inputted to one channel to be observed (there was no optical signal in that channel) and no signals were inputted to the other 8 channels, the output waveform of the observed channel was observed, as shown by output (a). Also, when the same DC light power was inputted to one channel to be observed and signals were inputted to the other 8 channels, the output waveform was observed, as shown by output (b). In FIG. 6, the input DC light power is 25 µW and the amplitude of the optical signal inputted to the other channels is 400 µW, which is the maximum input light power with which maximum cross-talk is observed. In (b), the influence of the other channels is observed. The maximum cross-talk can be converted to an input light power of 8 µW and the input light power is referred to as "equivalent cross-talk input power", Pix.

If, theoretically, Pix+Pn(−20)<PIL, a bit error rate $10^{-20}$ is ensured. PIL−Pix−Pn(−20) may be defined as a first margin and used as an index indicative of the reliability of the receiver.

Figure 7:
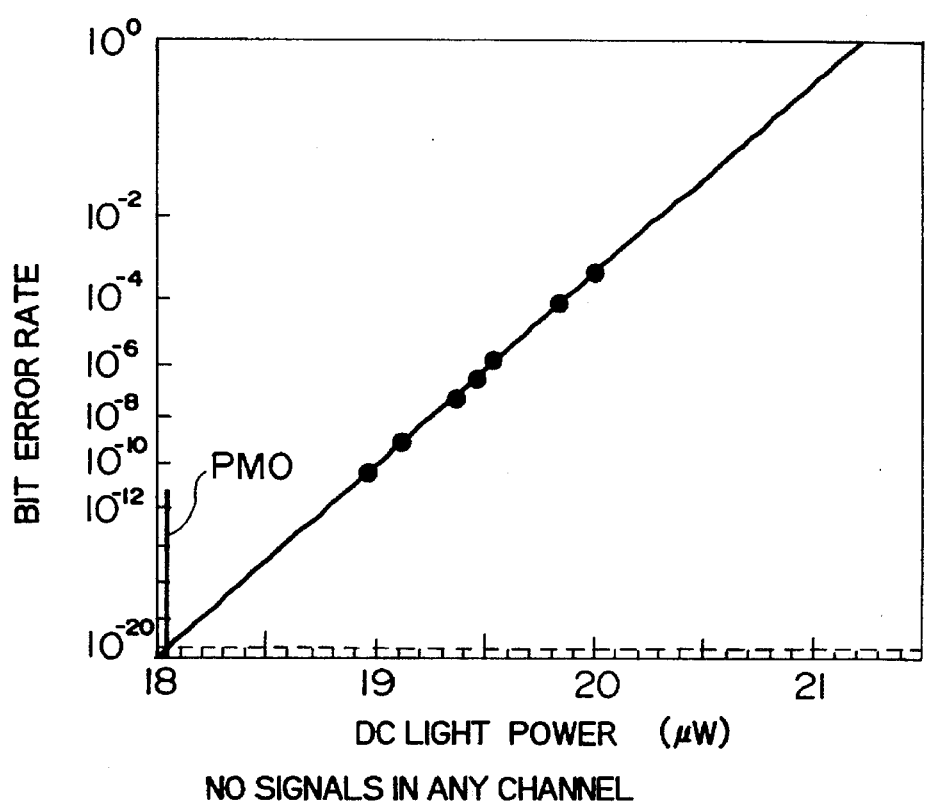
FIG. 7 shows the result of evaluation of a transmission bit error rate in the embodiment.
Figure 8:
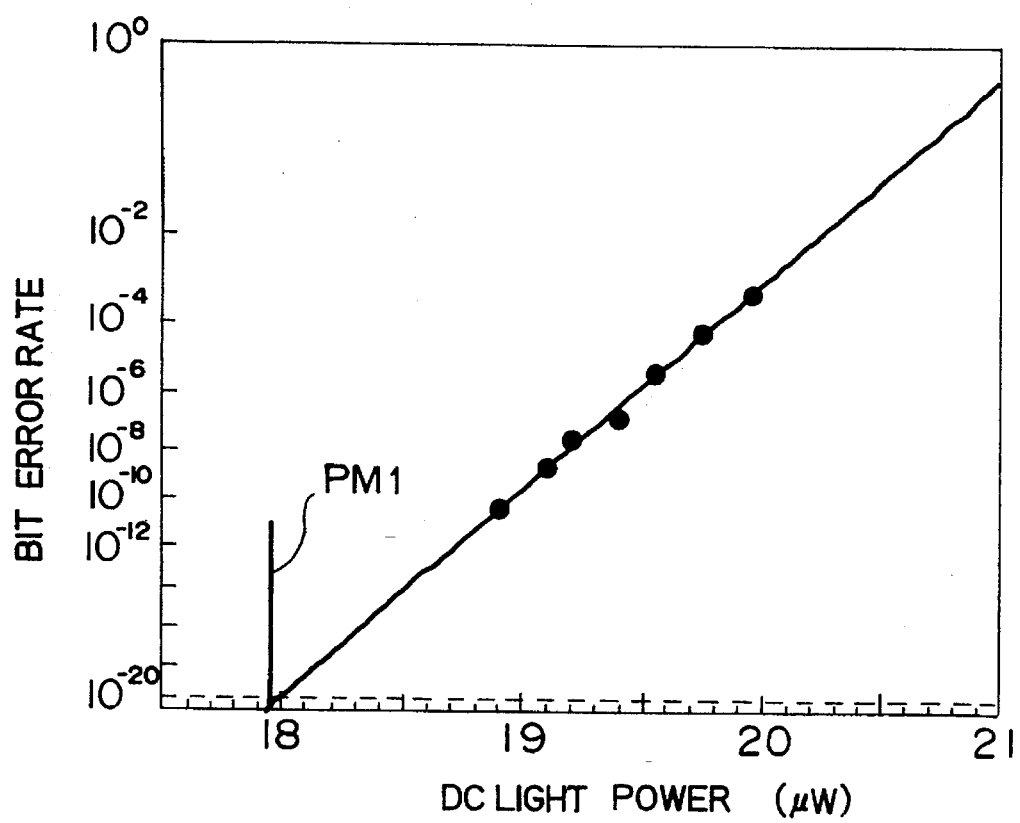
FIG. 8 shows the result of evaluation of a transmission bit error rate in the embodiment.
Figure 9:
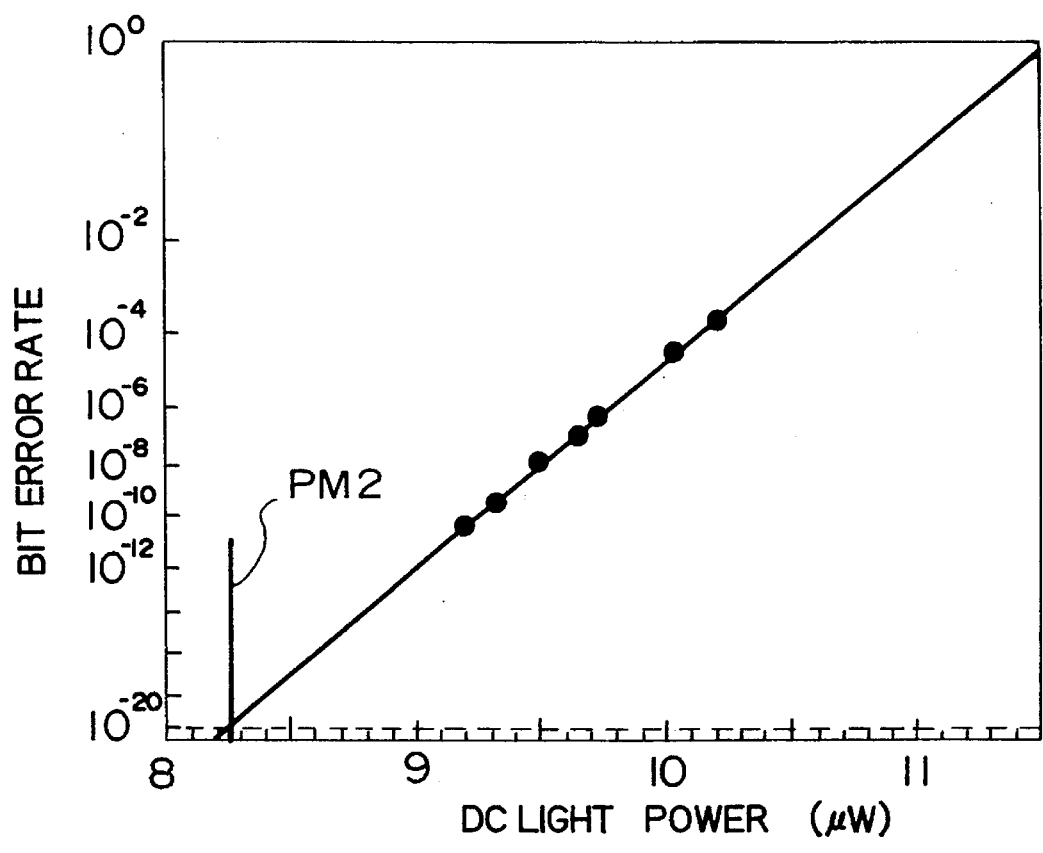
FIG. 9 shows the result of a first evaluation of a transmission bit error rate in the embodiment.
Figure 10:
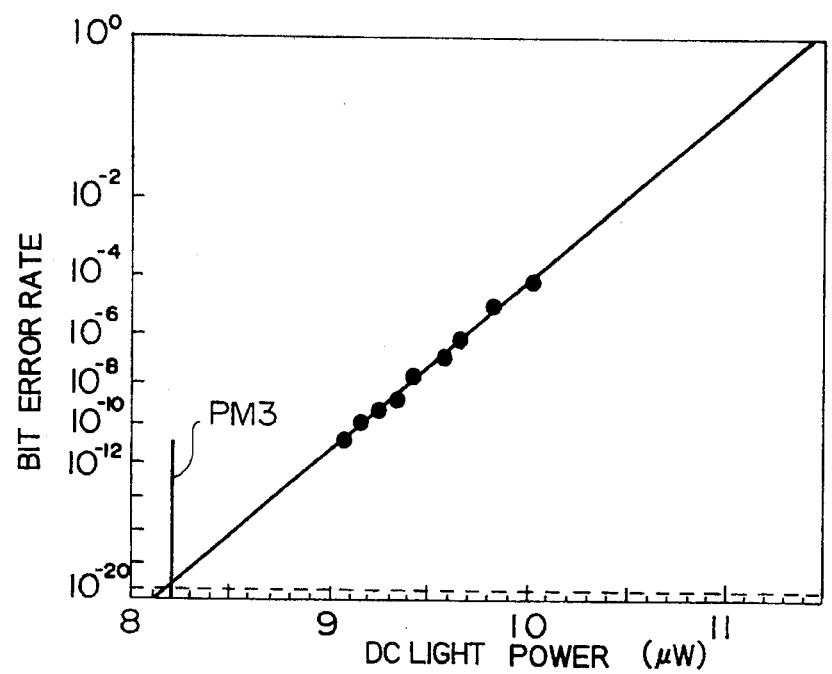
FIG. 10 shows the result of a second evaluation of a transmission bit error rate in the embodiment.

FIGS. 7–10 show transmission bit error rate characteristics. In the measurement, a DC light is added to a channel where the bit error rate characteristic is measured. FIG. 7 illustrates the case when there is no signal present in any of the channels; FIG. 8 illustrates the case when an optical signal is inputted to only the channel where the bit error rate is measured; FIG. 9 illustrates the case when there is no signal present in a channel where the bit error rate is measured, and optical signals are inputted to the other 8 channels; and FIG. 10 illustrates the case when optical signals are inputted to all the channels. The plotted black dots in FIGS. 7–10 denote the result of the measurement.

The bit error rate (BER) characteristic of the optical receiver is represented theoretically by the following equation 1:

$$BER = b(1) \int_{P_i-V_o+P_x}^{\infty} P(1)dt + b(0) \int_{V_o-P_x}^{\infty} P(0)dt \quad \text{(Eq. 1)}$$

where b(1), b(0) are the probability of appearance of 1 (Mark) and 0 (Space), respectively;

p(1), p(0) are the noise power densities of and 0, respectively;

$P_i$ is an input light power for 1;

$V_0$ is an equivalent threshold input power;

$P_x$ is a DC light power; and t is the amplitude of the optical signal.

When the equivalent threshold to input power is large enough compared to the equivalent noise power to input power, as in the present receiver, the bit error rate characteristic may be considered by the term related to extinction or 0 level. Thus, equation 1 is modified to modified to provide the following equation 2:

$$BER = \left(\frac{1-X}{2}\right) erfc\left(\frac{V_0 - P_x}{\sqrt{2}\ \tau}\right) \quad \text{(Eq. 2)}$$

-continued $$\text{where: } erfc(y) = \frac{2}{\sqrt{\pi}} \int_{y}^{\infty} \exp(-t^2)dt$$

where x is the mark ratio (probability of appearance of 1);

σ is the equivalent root mean square noise input power; and erfc is an error function defined as noted above.

Furthermore, Equation 2 is modified as follows:

$$erfc^{-1}\left(\frac{2}{1-x} BER\right) = \frac{V_o - P_x}{\sqrt{2}\ \sigma} \quad \text{(Eq. 3)}$$

Further, when the bit error rate characteristic BER is less than $10^{-4}$, Equation 3 is approximated as follows:

$$erfc(y) \approx \exp(-y^2) \quad \text{(Eq. 4)}$$

When the axes of abscissas and ordinates represent DC light power Px and $$\sqrt{\ln(BER)}\ ,$$

respectively, the relationship between both is represented by a straight line.

The result of measurement represented by black dots of FIGS. 7–10 coincides with the above theory and may be represented by a straight line.

In bit error rate measurement, the input optical signal is a pseudo-random pattern with a mark ratio of 0.5. The worst bit error rate in an unformatted manner occurs theoretically when the mark rate is 0 (b(1)=0, b(0)=1, or all the data is 0). The bit error rate at this time is twice that of the pseudo-pattern. However, when it is assumed that the input light power is large enough compared to the equivalent noise power to input power, as in the present embodiment, the bit error rate characteristic is most influenced by the input waveform to the comparator which distinguishes between 0 and 1. In the case of a pseudo-random pattern having a mark rate of 0.5, compared to the waveform when employing a mark rate of 0, influence of waveform degradation such as ringing and cross-talk is observed, and the bit error rate becomes worse.

The optical signal amplitude is a maximum input light power of 400 µW when the optical signal is inputted both to a channel to be measured and to the other 8 channels because the worst bit error rate characteristic due to ringing and cross-talk is observed.

When the phase of a clock signal is applied from the optical signal generator 100 to the bit error rate measuring unit 200, the phase of the clock is defined to the center of phases corresponding to a rise and a fall indicative of the bit error rate $10^{-3}$–$10^{-5}$ when the DC light power is 0. That is, the phase is changed in an error-free direction from a first phase indicative of the bit error rate $10^{-3}$–$10^{-5}$, and a second phase indicative again of the bit error rate $10^{-3}$–$10^{-5}$ is measured, and the midpoint between the first and second phases is used as a phase at which the bit error rate is observed. The difference between the first and second phases is referred to as the phase margin.

While the above clarifies the relationship between the power of the DC light and the bit error rate, a practical method of obtaining the bit error rate of the receiver will be described below.

Since there is no DC light in the actual state of use of the receiver, the bit error rate when the DC light is 0 may be predicted by extrapolation of an approximated straight line in FIGS. 7–10. The value of this bit error rate/(1—mark rate) may be defined as the bit error rate of the receiver.

When the equivalent threshold input power is large enough compared to the equivalent noise power to input power, the bit error rate obtained by the above-mentioned method is equal to, or less than, $10^{-80}$ and the value is not a practical scale. Thus, an index replacing the bit error rate will be described below.

When a random pattern with a mark rate x is inputted to a channel to be measured in FIGS. 7–10, the DC light power at the intersection of the product $(1-x)Pe$, where Pe is a required bit error rate, and the approximated straight line is defined as the light input power margin. That is, in FIGS. 7 and 9 where there is no optical signal, i.e., the mark rate is 0, the DC light powers at the intersections of bit error rates of $10^{-20}$ and a straight line correspond to the light input power margins PM0 and PM2. In FIGS. 8 and 10 where an optical signal having a random pattern of a mark rate of 0.5 is inputted, the DC light powers at the intersections of bit error rates of $0.5 \times 10^{-20}$ and a straight line correspond to the light input power margins PM1 and PM3.

The relationship between the light power margin and the receiver characteristic is as follows: Of course, the light input power margin must be larger than 0 in order to satisfy the requisite of the bit error rate. The light input power margin PM0, when there is no signal in any of the channels, depends on the decision-ambiguous amplitude (the magnitude of a fluctuation in the threshold) and the equivalent noise power to input power. In FIG. 7, PM0 is 18.00 μW.

The light input power margin PM1, when a signal is applied to the measured channel, demonstrates an influence as the input light extinction level waveform and ringing in the receiver more than PM0. The input light extinction level waveform depends on the waveform generated by the optical transmitter. Actually, the optical transmitter is designed such that no ringing occurs by using a laser as the light emitting element which is driven with an electric current less than the threshold current. The ringing occurs in the receiver when the signal changes from a mark (light emission) to a space (light extinction). However, the ringing is almost settled at a time of decision and does not effect the errors. In FIG. 8, PM1 is 17.95 μW which is slightly smaller than PM0.

The light input power margin PM2, when there is no signal in the measured channel and signals are applied to all other channels, demonstrates an influence on cross-talk occurring in the receiver. This influence is less than the above-mentioned cross-talk level because the phase when the maximum cross-talk is observed is different from the phase when the decision is made in this case. In FIG. 9, PM2 is 8.25 μW.

The light input power margin PM3, when signals are applied to all the channels, demonstrates an influence on ringing and a cross-talk occurring in the receiver. In FIG. 10, PM3 is 8.20 μW.

The difference between the DC light power when the bit error rate of FIGS. 7–10 is $Pe(1-x)$ and the threshold is the sum of waveform degradation, such as ringing and cross-talk, and the decision ambiguous amplitude.

As described above, the use of the light input power margin allows the representation of the influence of cross-talk and ringing in the form of a numerical value.

The influence of power supply noise must be considered in addition to the influences of the cross-talk and ringing in the actual operative environment. Also, the index of the influence of the power supply noise must be considered as a characteristic of the receiver.

Figure 11:
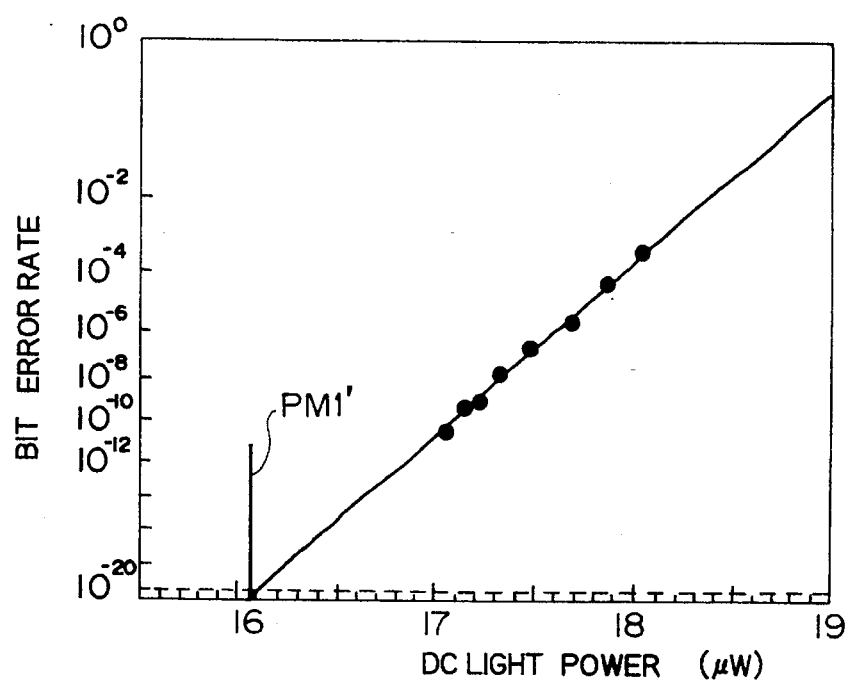
FIG. 11 shows the result of a third evaluation of a transmission bit error rate in the embodiment.

FIG. 11 shows a bit error rate characteristic obtained when a signal is applied to only the measured channel, which corresponds to FIG. 8, and noise of 100 mV at 1 kHz is superimposed on the power supply. The difference between the light input power margin PM1'(pn) at this time and PM1, obtained when there is no noise, is defined as the light input power margin degradation depending on power supply noise Ppn, which represents the magnitude of resistance to the power supply noise. In the present receiver, PM1' is 16.10 μW and Ppn is about 2 μW.

In the present embodiment, the low level input light power PIL, light input power margin PM1, equivalent cross-talk to input power Pix, and light input power margin degradation depending on power supply noise Ppn for the optical receiver are introduced from the results of the measurement and each value represents the characteristic of the optical receiver.

Modifications of the present embodiment will be described next. While the optical receiver to be tested and the testing apparatus described in the embodiment are of the 9-channel type, the number of channels is not limited in the present invention;, and may be 1.

When the optical receiver to be tested is of the type which includes a data latch, the testing apparatus may additionally include a clock feeding function for the data latch, a clock voltage adjusting function, and a data latch controlling function, and the testing method may be applicable.

Although in a embodiment the fixed decision level system is described, the testing method is not limited to such a system, but is applicable to any receiver which includes DC coupled circuits. An arrangement may be such that a DC light power, which does not saturate the output voltage of the receiver, for example, between the high and low level input light powers (between PIH and PIL), is inputted to the receiver, and the noise power and voltage distribution spectrum thereof are observed in order to predict the bit error rate.

As described above, in a receiver including DC coupled circuits which uses the extinction light level as a reference for defining the threshold, superposing DC light allows the measurement of the power of waveform degradation at the extinction level and the bit error rate characteristic. Particularly, in the multi-channel receiver, cross-talk at the extinction level and its influence on the bit error rate are measurable. Ringing is also measured as well as the cross-talk. Evaluation of the characteristic of a receiver of the fixed level decision system, which determines the threshold using the extinction level as a reference, may be achieved. These measuring methods ensure the required characteristic of the receiver.

What is claimed is:

1. A method of testing a characteristic of an optical receiver, including DC coupled circuits, comprising the steps of:

superimposing constant intensity light on an optical signal input to the optical receiver so as to shift an input-output characteristic of said optical receiver from a non-linear region to a linear region; and measuring an output voltage of the receiver.

2. A method according to claim 1, further comprising the step of:

changing a power level of the constant intensity light.

3. A method according to claim 2, further comprising the step of:

comparing the input optical signal with the output voltage signal, and calculating a bit error rate.

4. A method according to claim 1, further comprising the step of:

observing a waveform of the output voltage.

5. A method of testing a bit error rate of an optical receiver including DC coupled circuits, comprising the steps of:

superimposing constant intensity light on an optical signal input to the optical receiver;

measuring an output voltage of the receiver and generating an output voltage signal in response thereto;

comparing the input optical signal with the output voltage signal, and calculating a bit error rate in response thereto;

changing a power level of the constant intensity light, and obtaining a bit error rate for each of a plurality of power levels of the constant intensity light; and predicting a bit error rate, when there is no constant intensity light, from a relationship between the constant intensity light power levels and the bit error rates obtained by the measurement.

6. A method of testing a characteristic of a multi-channel receiver, including a plurality of integrated optical receivers each including DC coupled circuits, comprising the steps of:

applying constant intensity light only to a selected channel to be measured so as to shift an input-output characteristic of said optical receiver from a non-linear region to a linear region; and measuring an output of the selected channel to be measured.

7. A method according to claim 6, further comprising the steps of:

inputting signals to channels other than the selected channel to be measured; and measuring an influence of said signals input to the other channels on the selected channel to be measured to obtain a cross-talk characteristic.

8. An apparatus for testing a characteristic of a multi-channel optical receiver including plurality of integrated optical receivers each including DC coupled circuits, comprising:

a constant intensity light emitter capable of changing its power of light;

an optical signal generator having a plurality of output terminals equal in number to the channels of the receiver and capable of controlling a signal output for each output terminal;

a plurality of optical multiplexers equal in number to the channels of the receiver; and an optical switching unit for inputting the output of said constant intensity light emitter to any one of said optical multiplexers, wherein the output terminals of said optical signal generator are connected to the corresponding optical multiplexers, constant intensity light is superimposed through said switching unit on the channel to be tested, the output terminals of said optical adders are connected to the corresponding input terminals of said multi-channel optical receiver, and the output of said optical receiver is measured.

9. A method of representing characteristics of an optical receiver including DC coupled circuits in the form of numerals, comprising the steps of:

1) superimposing constant intensity light on input light;

2) changing a power level of the constant intensity light;

3) obtaining a power level of the constant intensity light which satisfies a predetermined condition;

4) repeating the steps 1)–3) under a plurality of measuring conditions which change characteristics of the optical receiver; and 5) using the difference between the first-obtained power of constant intensity light and the power of constant intensity light obtained at step 4) as a characteristic value representing the influence of said change on characteristics of the optical receiver.

* * * * *

UNITED STATES PATENT AND TRADEMARK OFFICE
CERTIFICATE OF CORRECTION

PATENT NO. : 5,548,399

DATED : August 20, 1996

INVENTOR(S) : Atsushi TAKAI, et al.

It is certified that error appears in the above-indentified patent and that said Letters Patent is hereby corrected as shown below: Title page, item [57], ABSTRACT, line 3, before "DC" insert --the-- and after "observe" insert --the--.

ABSTRACT, line 4, delete "the" before "measurement" and before "prediction".

Column 1, line 15, change "A" to --An--.

Column 1, line 44, change "satisfy" to --satisfies--.

Column 1, line 55, insert --to-- before "fluctuate,".

Column 2, line 57, before "in the case" insert --(4)--.

Column 3, line 19, delete "the" before "cross-talk".

Column 3, line 54, insert --A-- before "DC".

Column 4, line 5, insert --is-- before "mounted".

Column 4, line 47, change "lead" to --led--.

Column 4, line 66, change "provide" to --provides--.

Column 5, line 1, change "Logic) circuit," to --Logic circuit),--.

UNITED STATES PATENT AND TRADEMARK OFFICE
CERTIFICATE OF CORRECTION

PATENT NO. : 5,548,399
DATED : August 20, 1996
INVENTOR(S) : Atsushi TAKAI, et al.

It is certified that error appears in the above-indentified patent and that said Letters Patent is hereby corrected as shown below:

Column 5, line 4, change "current" to --circuit--.

Column 5, line 50, between "of" and "and" insert --1--.

Column 5, line 61, delete second "modified to".

Column 5, line 65, change "$(\sqrt{2\tau_1})$" to --  --.

Column 6, line 59, change "as a phase" to --as the phase--

Column 7, line 32, change "as" to --on--.

Column 8, line 21, change "invention;," to --invention,--.

Column 8, line 27, change "Although in a embodiment the fixed" to --Although in the embodiment a fixed--.

Column 9, line 37, between "including" and "plurality" insert --a--.

Signed and Sealed this

Sixth Day of May, 1997

BRUCE LEHMAN

*Attest:*

*Attesting Officer*    Commissioner of Patents and Trademarks